(12) United States Patent
Romero et al.

(10) Patent No.: US 6,957,162 B2
(45) Date of Patent: Oct. 18, 2005

(54) LOW-IMPACT ANALYZER INTERFACE

(75) Inventors: Gabriel L. Romero, Colorado Springs, CO (US); Fred Smith, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 154 days.

(21) Appl. No.: 10/705,638

(22) Filed: Nov. 10, 2003

(65) Prior Publication Data

US 2005/0114576 A1    May 26, 2005

(51) Int. Cl.$^7$ .......................... G01R 27/28; G06F 13/00

(52) U.S. Cl. ..................... 702/120; 702/122; 710/100

(58) Field of Search ................... 702/120, 117, 122; 710/62, 100, 107; 326/27, 30, 83, 90; 713/400, 713/600

(56) References Cited

U.S. PATENT DOCUMENTS 5,737,520 A  *  4/1998  Gronlund et al. ............. 714/39

* cited by examiner

*Primary Examiner*—John Barlow
*Assistant Examiner*—Meagan S Walling
(74) *Attorney, Agent, or Firm*—Cochran, Freund & Young, LLC

(57) ABSTRACT

Disclosed is a method and apparatus for providing a universal SCSI bus interface in which bus performance is not degraded, and the analyzer is not negatively influenced by post processing while maintaining the ability to filter and store data using any of a number of generic logic analyzers. The SCSI bus interface does not rely on a specific clock speed and maintains the ability to view both raw data and protocol errors. The universal SCSI bus interface embodiments described herein produce stable clock signals for use by an analyzer in a form that is phase and frequency stabilized with the SCSI bus clock. This allows data sampling to mimic the performance characteristics of a device attached to the SCSI bus thereby minimizing sampling error.

19 Claims, 3 Drawing Sheets

LOW-IMPACT ANALYZER INTERFACE

BACKGROUND OF THE INVENTION

1. Field of the Invention

The present invention relates to devices that analyze connectors and transceivers used to interconnect computer equipment and more specifically to a non-invasive small computer system interface (SCSI) bus monitoring interface and analysis system.

2. Description of the Background

Small computer systems interface (SCSI) is a parallel bus interface standard that is defined by a single-ended or differential electrical interface protocol. This high level protocol is similar to a system-level bus, with intelligent controllers on each SCSI device within a computer working together to manage the flow of information on a channel. SCSI architecture supports many different types of devices and operates somewhat like an additional bus for peripherals. These SCSI buses run at a variety of speeds, with new generation buses running faster than older ones, reflecting the increased performance of newer hardware. The current method of analyzing the SCSI bus is with analyzers that plug onto the SCSI bus which are designed for operation at slower speeds causing poor response characteristics and failures when used with today's faster buses. Additionally, present analyzers are very specific in that they require large-scale software upgrades to be utilized with each new SCSI bus. A need therefore exists for testing interfaces capable of non-invasive analysis. It would consequently be desirable to provide a universal SCSI bus analyzer interface for which performance is not degraded or negatively influenced by post processing, with the ability to filter and store data, while maintaining flexibility to use any one of number of generic logic analyzers.

SUMMARY OF THE INVENTION

The present invention overcomes the disadvantages and limitations of the prior art by providing a universal SCSI bus interface in which bus performance is not degraded, and the analyzer is not negatively influenced by post processing, while maintaining the ability to filter and store data using any of a number of generic logic analyzers. The SCSI bus interface does not rely on a specific clock speed and maintains the ability to view both raw data and protocol errors. The universal SCSI bus interface embodiments described herein produce stable clock signals for use by an analyzer in a form that is phase and frequency stabilized with the SCSI bus clock. This allows data sampling to mimic the performance characteristics of a device attached to the SCSI bus thereby minimizing sampling error.

The present invention may therefore comprise a low-impact universal interface for analyzing a SCSI bus with a digital logic analyzer comprising: a SCSI bus interface connector that connects the universal interface to the SCSI bus; one or more transceivers connected to the SCSI bus interface connector that convert a set of low voltage differential input signals to a set of single ended transceiver output signals; a field programmable gate array controller that receives the set of single ended transceiver output signals and provides programmed post-processing to at least a portion of the set of single ended transceiver output signals; a programmable clock connected to the field programmable gate array controller that produces a programmed clock signal that is utilized by the digital logic analyzer to synchronize data sampling on the SCSI bus; an erasable programmable read-only memory circuit connected to the field programmable gate array controller that provides programming information for the post-processing; a set of field programmable gate array controller output signals produced by the field programmable gate array controller; the set of field programmable gate array controller output signals that include an output clock signal and one or more trigger signals; and, an analyzer output connector that receives the set of single ended transceiver output signals and the set of field programmable gate array controller output signals and produces a digital logic analyzer input.

The present invention present invention may also comprise a method of interfacing a SCSI bus with a digital logic analyzer with an analyzer interface board to analyze a SCSI bus protocol comprising: connecting to the SCSI bus with a SCSI bus interface connector on the analyzer interface board; applying power to the analyzer interface board; transferring data on the SCSI bus to one or more transceivers on the analyzer interface board that convert a set of low voltage differential signals to a set of single ended transceiver output signals; receiving and post-processing at least a portion of the set of single ended transceiver output signals with the field programmable gate array controller; applying a programmable clock signal to the field programmable gate array controller with a programmable clock to provide an output clock signal that is utilized by the digital logic analyzer to synchronize data sampling on the SCSI bus; providing programming information for the post-processing with an erasable programmable read-only memory circuit connected to the field programmable gate array; producing a set of field programmable gate array controller output signals with the field programmable gate array controller that include the output clock signal and one or more trigger signals; and, receiving the set of single ended transceiver output signals and the set of field programmable gate array controller output signals to produce a digital logic analyzer input at an analyzer output connector.

Advantages of the various embodiments of the present invention include, but not by way of limitation or restriction of the claims, the ability of providing a universal SCSI bus interface where analyzer performance is not degraded or negatively influenced and by post processing. The disclosed embodiments have the ability to filter and store data, while maintaining flexibility to use any one of number of generic logic analyzers. The SCSI bus interface does not rely on a specific clock speed and maintains the ability to view both raw data and protocol errors. By utilizing a field programmable gate array, the interface can cover a wide range of protocols and be readily re-programmed to accept the new protocol. These added benefits may additionally allow an operator to utilize a lower level, or lower cost, analyzer because the sampling rate can be decreased and still provide adequate resolution utilizing the low-impact interface.

DETAILED DESCRIPTION OF THE INVENTION

Figure 1:
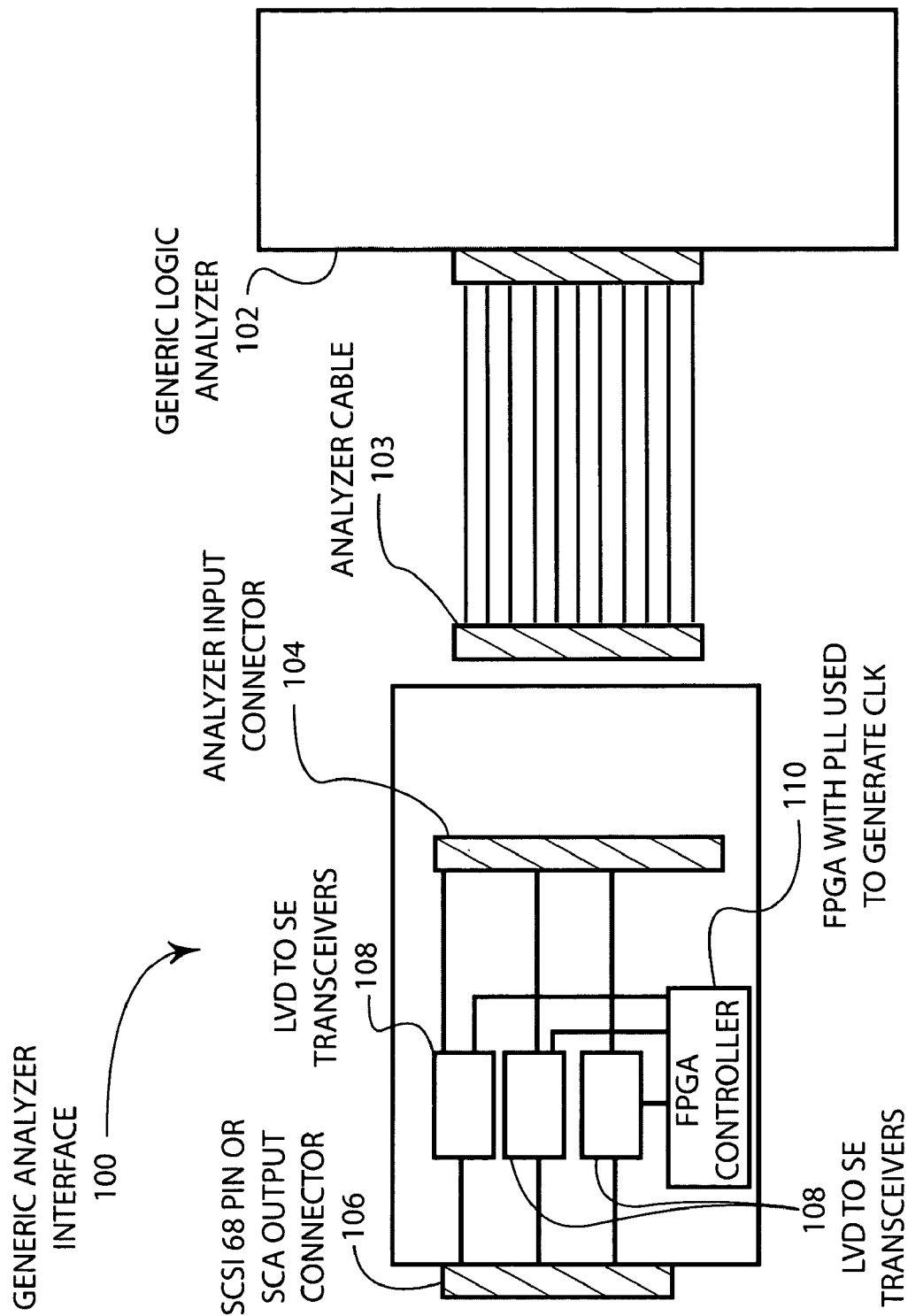
FIG. 1 illustrates an embodiment of a generic analyzer interface and connection to a generic logic analyzer unit.

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

FIG. 1 illustrates an embodiment of a generic analyzer interface and connection to a generic logic analyzer unit. As illustrated in FIG. 1, a generic analyzer interface card 100 is utilized as an interface between a SCSI Bus (not shown) and a generic logic analyzer 102. Within the process developing new and faster computer electronics, commercially available interfaces are designed for slower speeds and causing them to them have poor electrical characteristics on the bus. Logic analysis of the SCSI bus is often performed to verify that a chip within the electronic configuration is responding with the proper design protocol. Engineers often desire to look at a raw version of a design protocol in the development process rather than an actual post process version that is utilized once a product has been developed. This design protocol such as SCSI parallel interface IV (SPI-IV) can be the digital output of control lines, data and address lines and the verification that each of these outputs are following the rules that have been designed to perform.

The generic analyzer interface card 100 is designed to run at the speed of the SCSI bus that it is connected so as not to place undue load on the bus. This connection provides isolation between the bus being analyzed and a digital logic analyzer 102. Current analyzers that do not utilize post processing, significantly deteriorate signal quality and do not allow timing connection between the logic analyzer 102 and the SCSI bus. This makes it difficult to distinguish between sampling errors introduced into the system by a logic analyzer or actual protocol errors. The generic analyzer interface card 100 captures low voltage differential signals from a SCSI Bus (not shown) through a 68-pin SCSI or (SCA) connector 106 and performs a level translation or conversion from low voltage differential (LVD) to single ended (SE) with one or more LVD to SE transceivers 108. The transceivers are low capacitance and exhibit an identical load to that of a computer hard drive. Termination may be added if the analyzer interface is situated on the end of a bus, but typically, there is no termination as generic analyzer interface card 100 is designed to be a load only. This solves the current pod problem of excessively loading the bus and introducing noise due to circuit ringing. This is because most logic analyzers 102 view signals with a single ended implementation. The SE data signals are post processed, broken into phases and displayed in several different modes by a field programmable gate array (FPGA) controller 110. This FPGA 110 can be easily modified of programmed to adapt to SCSI bus protocol changes. Because there is no timing connection between the logic analyzer 102 and the and the SCSI bus, the FPGA 110 utilizes an internal phased loop lock (PLL) that locks onto the current clock signal on the SCSI bus and provides a clock signal to the logic analyzer 102 so that all the data that being sampled is synchronized to the data on the SCSI bus.

One function of the FPGA 110 is to act as a free running clock that can be phased loop locked or "locked" to either a request REQ or an acknowledge ACK receiver request, depending upon whether a transfer is a data-in or data-out transfer between a host and a target on the SCSI bus. This continuously provides a version of those clocks back to the logic analyzer 102 so a clock signal is available all times. The second function of the FPGA 110 is to monitor activity on the SCSI bus and generate complex trigger signals for use by the analyzer 102 or other equipment. This FPGA 110 is also programmable, allowing the controller to cover a wide range of protocols, change to a different type of protocol, or be re-programmed to accept the new protocol. The FPGA is general-purpose logic chip that can be configured or programmed via an erasable programmable read-only memory (EPROM) (not shown) that can also be mounted onto the analyzer interface card 100. The system is also versatile in having the ability to introduce reprogramming at any time.

Figure 2:
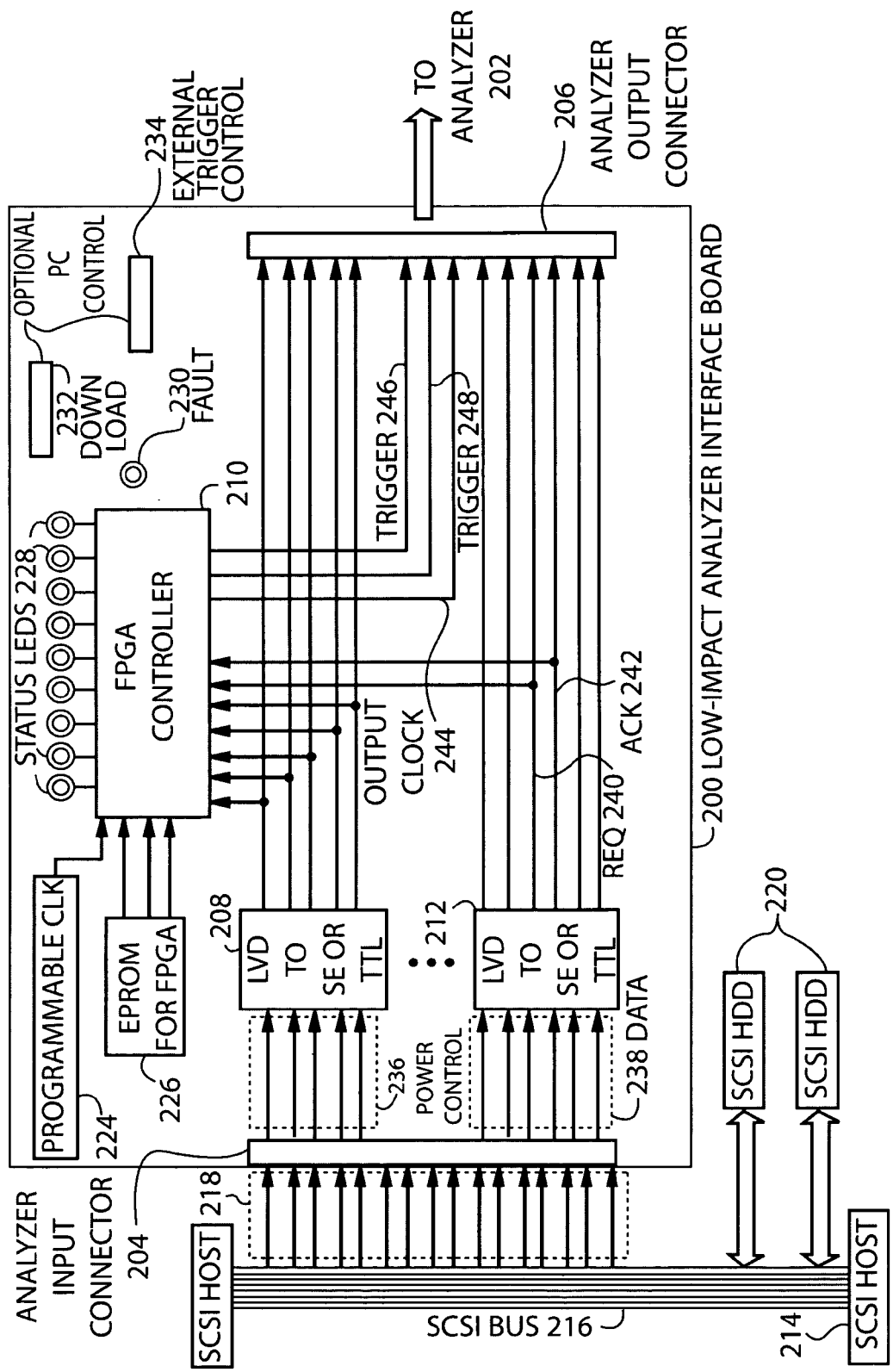
FIG. 2 illustrates a detailed schematic of an embodiment of a generic logic analyzer interface.

FIG. 2 illustrates a detailed schematic of an embodiment of a generic analyzer interface. As illustrated in FIG. 2, a SCSI host 214 containing a SCSI bus 216 which is used to communicate with peripheral components such as SCSI hard drive units HDD 220, is tapped into with a series of connections 218 such as 68-pin high-density connector and fed into an analyzer input connector 204. Once the series of connections 218 are brought onboard the low-impact analyzer interface board 200, the signals are introduced to one or more LVD to SE transceivers 208, 212 that perform a level translation or conversion of the output signals from LVD to SE. In this particular embodiment, the first LVD to SE transceiver 208 accepts power control signals 236 from the SCSI bus 216, and the second LVD to SE transceiver 212 accepts data signals 238 from the SCSI bus 216. Power control signals 236 are fed through to an analyzer output connector 206 and are tapped off to feed input into an FPGA controller 210. Data signals 238 are fed through to an analyzer output connector 206 in a similar manner with REQ 240 and ACK 242 signals being tapped off to additionally feed input into an FPGA controller 210, depending upon whether a transfer is a data-in or data-out transfer between a host and a target on the SCSI bus 216.

The FPGA controller 210 is fed clock signals from a programmable clock 224 and receives programming information form an EPROM 226. Optional personal computer (PC) control interfaces can be utilized to download 232 additional programming and interface the FPGA controller 210 logic in real time. An external trigger control 234 may be utilized to introduce manual or software controlled triggers into the FPGA controller 210 to expand the capability of the system and give greater control to the operator. The FPGA controller 210 outputs current status and indicates this with status LED's 228 mounted on the low-impact analyzer interface board 200. A clock signal 244 and two trigger signals 246 and 248 are output the FPGA controller 210 via the analyzer output connector 206 to the analyzer 202 (i.e., Agilent 167000 series logic analyzer or the like.) A fault indicator 230 is also controlled by FPGA controller 210 to signal either a download procedure error or other type of error detected in the system.

Figure 3:
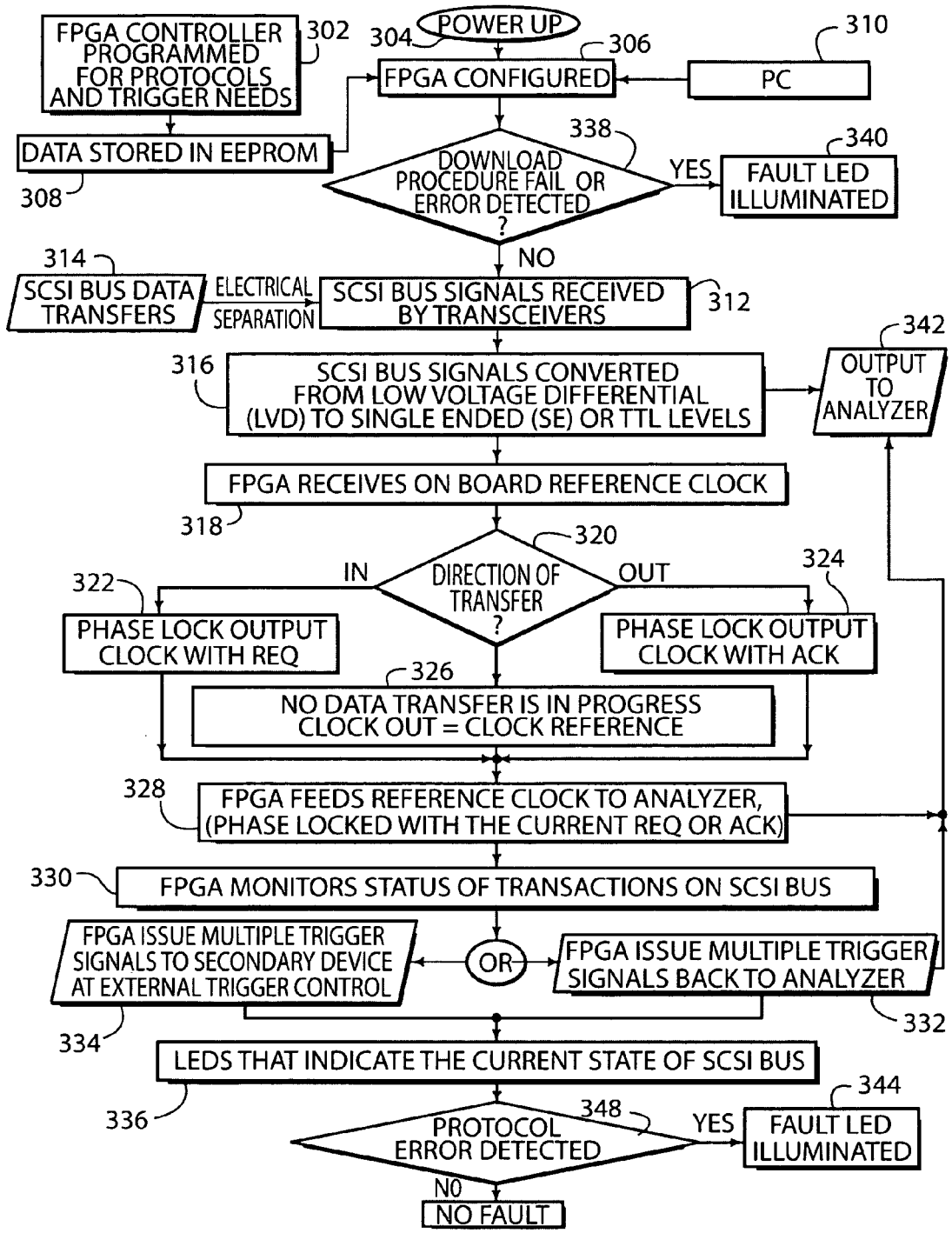
FIG. 3 is a flow diagram of a method of analyzing a SCSI bus utilizing a generic logic analyzer interface.

FIG. 3 is a flow diagram of a method of analyzing a SCSI bus utilizing a generic analyzer interface. The sequence detailed in FIG. 3 begins with a power up of a low-impact analyzer interface board at step 304, such as detailed in FIG. 2. Board power is either supplied externally or taken directly from the SCSI bus. Upon power up at step 304, an EPROM containing FPGA controller programming for protocols and trigger needs determined at step 302 is configured at step 306 from data stored onboard the EPROM at step 308 and/or downloaded manually or by software on a PC at step 310. If there is an error in configuring the FPGA, a fault LED is illuminated at step 340. The SCSI bus data transfers are tapped into and the SCSI bus signals at step 314 and are received by transceivers at step 312 while being electrically isolated from the analyzer, thus, maintaining signal quality in the SCSI bus. These SCSI bus signals are converted from LVD to SE or TTL levels at step 316 and output to the digital logic analyzer at step 342. The FPGA receives on board reference clock signal at step 318 from the programmable clock and depending upon the direction of data transfer at step 320, the phase lock output clock of the FPGA is determined. A data in transfer results and a phase locked output clock with REQ at step 322, a data out transfer results and a phase locked output clock with ACK at step 324, then when there is no data transfer in progress, the phase lock output clock is equal to the on board reference clock signal at step 318. This provides the analyzer with a synchronized sampling capability.

The FPGA then feeds the reference clock to the analyzer that is phase locked with the current REQ or ACK at step 328 and then monitors the status of transactions on the SCSI bus at step 330. The FPGA then issues multiple trigger signals back to the analyzer at step 332 or to a secondary device at the external trigger control at step 334. An LED light array indicates the current status of the SCSI bus at step 336 and a final error detection is completed at step 348 with a positive detection illuminating a fault LED at step 344 and a negative detection resulting on a no fault status at step 346.

For example, an Ultra 320 SCSI maintains a free running clock. This clock is either REQ or ACK, whenever a paced transfer is enabled. There is also a half speed clock P1 that indicates whether a state is valid or not. This analyzer interface will allow an operator to capture data from the SCSI bus, post process the data, break the data signals into phases, and display the signals with a digital logic analyzer. In one embodiment, a small block of logic following the states of the SCSI bus can be used to produce a separate signal called Data Valid. As the valid state of a U320 bus is determined by the running state of P1, it is not easily decoded without returning to the start of the transfer. This embodiment will allow an operator to instantly see what data is valid and which is not. This logic, therefore, can be implemented via an FPGA and easily upgraded with future protocol changes.

Embodiments allow a user to select the level of data that is viewed from raw bus data or post processed data with one piece of equipment. When equipped with an SCA connector, this device is it can easily be fitted into a back plane of a computer (as if it were a hard drive) without soldering wires or other installation concerns. This offers tremendous time-savings and increased measurement reliability. In addition, the FPGA could be programmed to produce error signals that can be triggered upon if protocol errors are detected. The aforementioned embodiments described herein produce stable clock signals to clock the analyzer in a form that is phase and frequency stabilized with the SCSI bus clock so that you are sampling the same way that a device would sample the SCSI Buss. Therefore, you would be seeing what the device would be seeing.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A low-impact universal interface for analyzing a SCSI bus with a digital logic analyzer comprising:
   a SCSI bus interface connector that connects said universal interface to said SCSI bus;
   one or more transceivers connected to said SCSI bus interface connector that convert a set of low voltage differential input signals to a set of single ended transceiver output signals;
   a field programmable gate array controller that receives said set of single ended transceiver output signals and provides programmed post-processing to at least a portion of said set of single ended transceiver output signals;
   a programmable clock connected to said field programmable gate array controller that produces a programmed clock signal that is utilized by said digital logic analyzer to synchronize data sampling on said SCSI bus;
   an erasable programmable read-only memory circuit connected to said field programmable gate array controller that provides programming information for said post-processing;
   a set of field programmable gate array controller output signals produced by said field programmable gate array controller; said set of field programmable gate array controller output signals that include an output clock signal and one or more trigger signals; and,
   an analyzer output connector that receives said set of single ended transceiver output signals and said set of field programmable gate array controller output signals and produces a digital logic analyzer input.

2. A device of claim 1 wherein said field programmable gate array controller determines the direction of transfer between said analyzer and a target on said SCSI bus and acts as a free running clock that transmits said output clock signal to said analyzer.

3. A device of claim 2 wherein said output clock signal is said programmed clock signal when no data transfer is in progress, said output clock signal is phase locked to request during a data-in transfer, and said output clock signal is phase locked to acknowledge during data-out transfer.

4. A device of claim 1 wherein said field programmable gate array controller is re-programmed to accept and execute new testing protocols.

5. A device of claim 1 wherein said universal interface further comprises a programming link to said field programmable gate array controller to download programming to said field programmable gate array controller from an external computer source.

6. A device of claim 1 wherein said universal interface further comprises an external trigger controller connected to said field programmable gate array controller to introduce external trigger commands said universal interface.

7. A device of claim 1 wherein said universal interface is impendence matched to said SCSI bus to minimize noise introduced by said universal interface.

8. A device of claim 1 wherein said transceivers are configured with a receive interface to said SCSI bus, and a transmit interface to said digital logic analyzer.

9. A device of claim 1 wherein said transceivers are low capacitance with a load matching to that of a computer hard drive.

10. A method of interfacing a SCSI bus with a digital logic analyzer with an analyzer interface board to analyze a SCSI bus protocol comprising:
  connecting to said SCSI bus with a SCSI bus interface connector on said analyzer interface board;
  applying power to said analyzer interface board;
  transferring data on said SCSI bus to one or more transceivers on said analyzer interface board that convert a set of low voltage differential signals to a set of single ended transceiver output signals;
  receiving and post-processing at least a portion of said set of single ended transceiver output signals with said field programmable gate array controller;
  applying a programmable clock signal to said field programmable gate array controller with a programmable clock to provide an output clock signal that is utilized by said digital logic analyzer to synchronize data sampling on said SCSI bus;
  providing programming information for said post-processing with an erasable programmable read-only memory circuit connected to said field programmable gate array;
  producing a set of field programmable gate array controller output signals with said field programmable gate array controller that include said output clock signal and one or more trigger signals; and,
  receiving said set of single ended transceiver output signals and said set of field programmable gate array controller output signals to produce a digital logic analyzer input at an analyzer output connector.

11. A method of claim 10 wherein said step of receiving and post-processing at least a portion of said set of single ended transceiver output signals with said field programmable gate array controller further comprises:
  determining the direction of transfer between said analyzer and a target on said SCSI bus; and,
  transmitting said output clock signal to said analyzer with said field programmable gate array controller that is based upon said direction of transfer.

12. A method of claim 10 wherein said step of receiving and post-processing at least a portion of said set of single ended transceiver output signals with said field programmable gate array controller further comprises:
  determining the direction of transfer between said analyzer and a target on said SCSI bus;
  transmitting said output clock signal to said analyzer with said field programmable gate array controller as said programmed clock signal when no data transfer is in progress;
  transmitting said output clock signal to said analyzer with said field programmable gate array controller as a phase locked to request during a data-in transfer; and,
  transmitting said output clock signal to said analyzer with said field programmable gate array controller as said output clock signal is phase locked to acknowledge during data-out transfer.

13. A method of claim 10 further comprising the step of:
  re-programming said field programmable gate array controller to accept and execute additional test protocols.

14. A method of claim 10 further comprising the step of:
  downloading programming to said field programmable gate array controller with a programming link from an external computer source.

15. A method of claim 10 further comprising the step of:
  introducing an external trigger command to said universal interface with an external trigger controller connected to said field programmable gate array.

16. A method of claim 10 further comprising the step of:
  minimizing noise introduced by said universal interface by impendence matching said universal interface to said SCSI bus.

17. A method of claim 10 wherein said step of receiving and post-processing at least a portion of said set of single ended transceiver output signals with said field programmable gate array controller further comprises:
  configuring said transceivers with a receive interface to said SCSI bus, and a transmit interface to said digital logic analyzer.

18. A method of claim 10 further comprising the step of:
  load matching capacitance of said transceivers to that of a computer hard drive.

19. A low-impact universal interface means for analyzing a SCSI bus with a digital logic analyzer comprising:
  a SCSI bus interface connector means for connecting said universal interface to said SCSI bus;
  one or more transceiver means connected to said SCSI bus interface connector for converting a set of low voltage differential input signals to a set of single ended transceiver output signals;
  a field programmable gate array controller means for receiving said set of single ended transceiver output signals and providing programmed post-processing to at least a portion of said set of single ended transceiver output signals;
  a programmable clock means connected to said field programmable gate array controller means for providing a programmed clock signal that is utilized by said digital logic analyzer to synchronize data sampling on said SCSI bus;
  an erasable programmable read-only memory circuit means connected to said field programmable gate array controller means for providing programming information for said post-processing;
  a set of field programmable gate array controller output signal means produced by said field programmable gate array controller means; said set of field programmable gate array controller output signal means that include an output clock signal and one or more trigger signals; and,
  an analyzer output connector means for receiving receives said set of single ended transceiver output signals and said set of field programmable gate array controller output signal means for producing a digital logic analyzer input.

* * * * *